(12) United States Patent
Coleman et al.

(10) Patent No.: US 11,463,392 B2
(45) Date of Patent: Oct. 4, 2022

(54) REGULATION OF SPF POLICY TERMS

(71) Applicant: Fraudmarc Inc., Atlanta, GA (US)

(72) Inventors: Keith Wayne Coleman, Atlanta, GA (US); Richard Duncan, Atlanta, GA (US)

(73) Assignee: Fraudmarc Inc., Atlanta, GA (US)

( * ) Notice: Subject to any disclaimer, the term of this patent is extended or adjusted under 35 U.S.C. 154(b) by 0 days.

(21) Appl. No.: 17/504,423

(22) Filed: Oct. 18, 2021

(65) Prior Publication Data

US 2022/0124059 A1    Apr. 21, 2022

Related U.S. Application Data

(60) Provisional application No. 63/092,871, filed on Oct. 16, 2020.

(51) Int. Cl.
    *H04L 51/212*      (2022.01)
    *H04L 9/40*      (2022.01)

(52) U.S. Cl.
    CPC ............ *H04L 51/212* (2022.05); *H04L 63/20* (2013.01)

(58) Field of Classification Search
    CPC ................................ H04L 51/12; H04L 63/20
    See application file for complete search history.

(56) References Cited

U.S. PATENT DOCUMENTS

| | | | |
|---|---|---|---|
| 3,090,940 | A1 | 1/2012 | Fenton et al. |
| 8,392,357 | B1 | 3/2013 | Zou et al. |
| 11,019,076 | B1 | 5/2021 | Jakobsson et al. |
| 11,171,939 | B1 | 11/2021 | Blank et al. |
| 11,200,581 | B2 | 12/2021 | Williams et al. |
| 11,212,245 | B1 | 12/2021 | Ding et al. |
| 11,223,599 | B1 | 1/2022 | Mielke et al. |
| 2005/0144451 | A1 | 6/2005 | Voice et al. |

(Continued)

OTHER PUBLICATIONS

Lars Lind Nilsson et al. (Jan. 14, 2017). What does a "-all" do in an included (secondary) SPF record? Super User. Retrieved Jan. 8, 2022, from https://superuser.com/questions/1167143/what-does-a-all-do-in-an-included-secondary-spf-record (Year: 2017).*

(Continued)

*Primary Examiner* — Austin J Moreau
(74) *Attorney, Agent, or Firm* — Bekiares Eliezer LLP

(57) ABSTRACT

Sender Policy Framework (SPF) is a widely used method of distinguishing authorized email from unauthorized email. SPF policies are published into a domain's DNS and then looked up and evaluated by mail receivers. Due to the complexity and limitations of the SPF specification, implementation mistakes and risks are widespread. This problem is compounded by the common practice of nesting SPF policies which introduces hidden risks, particularly exceeding DNS lookup limits. Embodiments of the present disclosure enable new SPF techniques such as selectively inactivating parts of a policy by introducing a virtual-all term, designed to secure against the third-party term inclusions in the policy. When the primary policy is online, the virtual-all term may serve as a terminate policy evaluation much like a traditional "all" term. If the primary policy is offline, a "fail open" may be produced, allowing policy evaluation to proceed into previously inactivated segment of the policy.

18 Claims, 6 Drawing Sheets

(56) References Cited

U.S. PATENT DOCUMENTS

| | | | |
|---|---|---|---|
| 2006/0031319 | A1 | 2/2006 | Nelson et al. |
| 2006/0179113 | A1 | 8/2006 | Buckingham et al. |
| 2008/0184366 | A1 | 7/2008 | Alperovitch et al. |
| 2008/0189770 | A1 | 8/2008 | Sachtjen |
| 2008/0282344 | A1 | 11/2008 | Shuster |
| 2008/0307226 | A1 | 12/2008 | Chow et al. |
| 2009/0147936 | A1 | 6/2009 | Won et al. |
| 2010/0121928 | A1 | 5/2010 | Leonard |
| 2013/0086187 | A1 | 4/2013 | Cohen et al. |
| 2014/0181516 | A1 | 6/2014 | Yoshioka |
| 2014/0215571 | A1 | 7/2014 | Shuster |
| 2017/0093772 | A1 | 3/2017 | Gupta |
| 2018/0227259 | A1 | 8/2018 | Gupta |
| 2019/0141077 | A1 | 5/2019 | Tyler et al. |
| 2019/0222608 | A1 | 7/2019 | Naccarato et al. |
| 2019/0379660 | A1 | 12/2019 | Thirumavalavan |
| 2020/0213332 | A1 | 7/2020 | Thirumavalavan |
| 2021/0126942 | A1 | 4/2021 | Fantham et al. |

OTHER PUBLICATIONS

Hakan Lindqvist et al. (May 8, 2017). SPF with -all includes directive with ~all? Server Fault. Retrieved Jan. 8, 2022, from https://serverfault.com/questions/848711/spf-with-all-includes-directive-with-all (Year: 2017).*

Roaima et al. (Nov. 9, 2015). Adding an SPF record for a 3rd party, but don't have one for my own domain. Server Fault. Retrieved Jan. 8, 2022, from https://serverfault.com/questions/734297/adding-an-spf-record-for-a-3rd-party-but-dont-have-one-for-my-own-domain/734308 (Year: 2015).*

MadHatter et al. (Mar. 4, 2012). What are SPF records, and how do I configure them? Server Fault. Retrieved Jan. 8, 2022, from https://serverfault.com/questions/369460/what-are-spf-records-and-how-do-i-configure-them/369478#369478 (Year: 2012).*

Introducing universal SPF. Fraudmarc. (Oct. 28, 2020). Retrieved Apr. 22, 2022, from https://web.archive.org/web/20201028193117/https://fraudmarc.com/introducing-universal-spf/ (Year: 2020).*

Copending U.S. Appl. No. 17/504,433, filed Oct. 18, 2021 entitled "Inline SPF Service Provider Designation" Inventors: Keith Wayne Coleman et al.

* cited by examiner

Table 1: SPF policy with inactivation term qualified to fail every match. Note that the top policy is linewrapped to fit on the page.

| Name | Data |
|---|---|
| @ | "v=spf1 <active policy terms> -include:_stophere.example.com <inactive policy terms>" |
| _stophere | "v=spf1 +all" |

*FIG. 1*

REGULATION OF SPF POLICY TERMS

RELATED APPLICATIONS

Under provisions of 35 U.S.C. § 119(e), Applicant claims the benefit of U.S. Provisional Application No. 63/092,871 filed on Oct. 16, 2020, which is incorporated herein by reference.

Related U.S. patent application Ser. No. 17/504,433 filed on even date herewith, in the name of Keith Wayne Coleman and Richard Duncan, entitled "INLINE SPF SERVICE PROVIDER DESIGNATION," assigned to the assignee of the present application, in its entirety, is hereby incorporated by reference.

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to email, identity, security, SMTP, DNS, DMARC, and SPF.

BACKGROUND

Organizations often utilize third party services that may involve sending email messages on their behalf. Vendors in turn often publish corresponding Sender Policy Framework (SPF) policies crafted to allow verification of messages sent by their servers or servers that are, in turn, contracted to send on their behalf. Thus, when a vendor publishes a policy that is inadequate, incompetent, or error prone, the domain that includes such a policy inherits such problems created outside of their control, i.e., the organization lacks sovereignty over the set of IPs that they may declare as legitimate senders for them.

The DNS querying term constraint specification is a common problem encountered by domain owners who utilize a significant compliment of service providers, the operations of which involve the sending of email on behalf of the client domain. In certain aspects, the limit may be ten DNS queries. Upon breaching this threshold, an exception to the policy evaluation process may be generated resulting in an SPF permerror.

Moreover, as many service providers themselves manage include-able SPF policies with a multiplicity of DNS querying terms, their clients in turn accumulate those lookup counts into the including policy. Some common vendors, in fact, already exceed this threshold, whereby any domain including them may also suffer the querying term count threshold breach.

As SPF-implementing Email Service Providers (ESPs) sometimes suffer other common problems in their policies, e.g., circular-evaluation loops, void-lookup limits, and multiple redirect terms, client policies become prone to the errors realized by such problems, effectively rendering authentication checks imprecise and unreliable. In short, by using external service providers, domain message validity checks are at the mercy of policies developed outside of an organization's governance.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 1 illustrates a table consistent with embodiments of the present disclosure;

DETAILED DESCRIPTION

Figure 2:
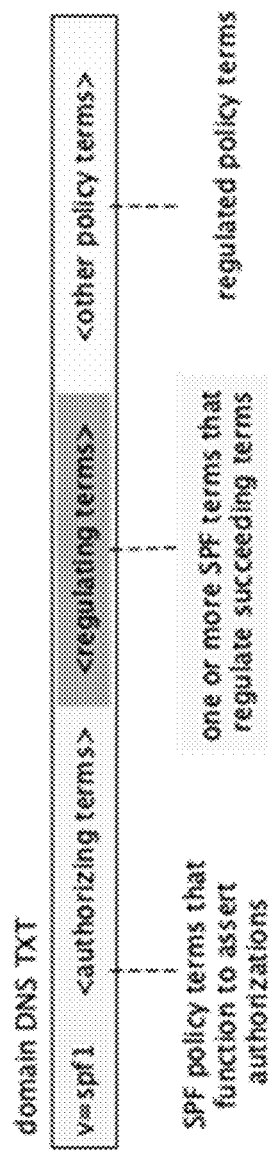
FIG. 2 illustrates an SPF schema consistent with embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of SPF1, embodiments of the present disclosure are not limited to use only in this context.

It should be further noted that the present disclosure illustrated nested +all/all terms. In many instances, this functionality will be contrary to certain standards and fail to operate as illustrated. Rather, the nested +all/all terms are provided for illustrative purposes. In the case of out-of-order SPF policy processing, the nested all terms represent the inverse of the active terms in the SPF policy (e.g., all ip-addresses not covered by the active policy terms). In the case of left-to-right SPF policy process, the nested all terms may represent the universe of domains and IP addresses.

While many aspects and features relate to, and are described in, the context of -include term as the virtual all modifier and mechanism, it should be understood that the "virtual all" term, as used herein, may be comprised of any appropriate SPF modifier or mechanism. Moreover, it should be understood that the term "virtual" and "all" combined in "virtual all" are merely illustrative terms, without any implication of the plain definition of such terms. Rather, the "virtual all" term used herein should be constructed based on any SPF modifier and mechanism used to achieve the features and functions disclosed herein.

Overview

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Sender Policy Framework (SPF) is one of the most widely used methods of distinguishing electronic mail that is authorized by the purported sending domain from unauthorized mail. SPF policies are published into a domain's DNS and then looked up and evaluated by mail receivers. Due to the complexity and limitations of the SPF specification, implementation mistakes are widespread. This problem is compounded by the common practice of nesting SPF policies which introduces hidden risks, particularly exceeding DNS lookup limits. Existing methods of addressing these problems typically come at the cost of further obfuscating the intent of the SPF policy and may defeat secondary uses of SPF policies such as domain ownership verification by email service providers. Embodiments of the present disclosure enable new SPF techniques such as selectively inactivating parts of a policy. Such SPF technique may provide a virtual all term, as further described herein, for generation, publication, and provision.

This includes, but is not limited to, an ability to combine a primary policy and one or more fallback policies in a single SPF policy. When the primary policy is online, a virtual all term may serve to terminate policy evaluation much like a traditional "all" term. If the primary policy is offline, the virtual all term may generate a "fail open," allowing policy evaluation to proceed into a previously inactivated segment of the policy. Embodiments related hereto may incorporate, by reference, and in its entirety, the U.S. patent application Ser. No. 17/504,433, filed on even date herewith, in the name of Keith Wayne Coleman and Richard Duncan, entitled "INLINE SPF SERVICE PROVIDER DESIGNATION.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

SPF Policy Construction and Evaluation

Sender Policy Framework (SPF) policies principally serve as a way for authorizing domains to systematically inform message verifiers about which hosts are allowed to send mail on their behalf. Deploying an SPF for this purpose involves constructing policies using static terms, understanding that the terms will be individually evaluated from left to right during the authentication process until an exception or a 'match' is detected.

The SPF "All" Term

One way to specify the SPF protocol is to include an 'all' term. The all term always returns a 'match' when tested during the verification process. Therefore, if an all term is not evaluated last, the SPF protocol will identify a match and not consider subsequent mechanisms. Because of this designed behavior, the all term is recommended, by standards specifications, to be situated as the last term in a policy; even in the case where no all term is explicitly represented in the policy, the default action of the underlying verifier would be to effectively treat the policy as though a trailing all were present, i.e., upon testing the implied all, the output should be a "neutral" result.

Specifically, policies may be configured so that mechanisms after "all" will not be tested. Mechanisms listed after "all" would be ignored. In some aspects, using either a redirect modifier or an all mechanism to affect a default action if no other terms result in a match may be better than allowing the default neutral result.

SPF Policy Management as a Service

In the space of businesses that provide services around email message authentication, specifically those that actively manage SPF policies for their clients, it has become common to implement an SPF term in the client domain's policy which effectively delegates the burden of managing authentication tests to the provider. This scheme takes different forms. For example, some use an SPF mechanism such as an include term endowed with a set of macro fields to effect DNS-level identification and authorization during SPF verifications. Others may use a simple include or redirect term to direct verifiers over to a more traditional policy.

The manner in which such schema are deployed is sometimes a deliberate attempt to address specific problems that are characteristic of SPF constraints. Given the complexity of the SPF protocol, specifically when coupled to the DMARC monitoring and enforcement paradigm, it is not surprising that many policies developed by non-specialists suffer from certain typical errors or oversights.

One simple but common problem is properly constructing policies to fit into the DNS TXT record string-size constraint. If this is done incorrectly, it can easily lead to syntax errors which, upon message verification, immediately disqualifies the policy as erroneous thus precluding any chance that any message can authenticate according to the domain owner's intent. Third party systems often address such limitations by layering protections against such errors into their systems.

a. Example: SPF Policy Flattening

An increasingly routine method for addressing the SPF specified DNS-querying term constraint is to implement some form of policy flattening. This technique may involve ex-situ collection of the IP addresses for all hosts authorized to send email on behalf of the domain, removing duplicates, and aggregating contiguous addresses into Classless Inter-Domain Routing (CIDR) blocks. These IP blocks may then be published as non-DNS-querying ip4 or ip6 terms in the domain's policy. As characteristic DNS record size limits are realized, recursive include terms can be constructed to facilitate overflow policies until the full set of IPs are covered. While it is still possible to exceed the ten query limit using such a scheme, under most conditions it can provide significantly greater capacity for declaring host addresses.

For example, suppose a domain's pre-existing SPF policy is characteristically similar to the following:

v=SPF1 mx a include:_SPF.google.com include:_SPF.some_esp1.com include:_SPF.another_esp2.com -all In this example, including the _SPF.google.com term adds 4 DNS querying terms to the policy. Suppose that _SPF.someesp1.com adds another 7 DNS querying terms.

Then, left-to-right checks would return a 'permerror' before ever reaching the IPs declared under the _SPF.another_esp2.com policy. Therefore, the messages should not be expected to pass.

SPF policy flattening may fix this problem; a flattened policy that significantly reduces the DNS query term burden may resemble the following:

v=spf1 ip4:3 5.190.247.0/2 4 ip4:64.233.1 6 0.0/1 9 ip4:66.10 2 0.0.0/2 . . . <many other IPs> . . . .

The above example only illustrates the first few terms. In cases where flattening is needed to gain better control over DNS querying term counts, the number of ip6 terms may be a great many, partitioned into recursive set of includes as DNS record and data-transfer packet sizes constraints may demand.

b. SPF Service Provider Implementations

One way to implement policy flattening by an SPF service provider may be to include or redirect terms that direct verifiers to a separate policy under the provider's control, e.g., constructed from the client's list of authorized sending hosts IPs. The service provider may onboard the client by first harvesting policy data from an existing record, then engineering and hosting a new policy, say hosted at the domain: _SPF.domain.example.net. Finally, the domain owner may then only need to host a top-level policy similar to the following:

v=SPF1 include:_SPF.domain.example.net -all

Since all of the policies inherited from the previous SPF include terms are no longer present, so should be the various problems that could have resulted from those external sources, e.g., too many DNS querying terms, non-existent hosts, circular references, etc.

Alternative Uses by Service Providers

Protocol-unsupported uses of customer SPF policies may be leveraged to address some business operations unrelated to email message authentication. Perhaps the most prominent is the use by ESPs to validate access to a client domain DNS by the signatory to the account. This validation process typically requests the client to publish an SPF policy with the provider's particular include term.

For example:

v=SPF1 include:SPF.someesp.com ?all

Subsequently, the provider parses the policy and performs a simple search for the string or an indication that the domain owner has explicitly edited their DNS to reflect their consent to use the service. Once the string is found, the provider verifies the client to use the service for the domain.

Problems Caused by Competing Interests

Consider the domain owner wishing to improve the reliability of their SPF policies by employing techniques that may overcome common problems. A prevalent example is the previously mentioned use of SPF policy flattening to comply with the DNS querying term constraint. In situations where alternative uses of SPF policies are employed, e.g., for domain validations by ESPs, the use of such techniques may preclude the ability of the domain owner to comply with the ESP's validation process. In particular, if the mechanism constituents of a domain's top level SPF policy is exclusively a set of ip4 and ip6 terms, then the simple string-matching technique employed by some ESPs to validate the domain will fail, even in cases where the entirety of the ESP's SPF policy IPs are present.

Therefore, domain owners must make a choice. Should IP flattening be disabled and publish the include term requested by the service provider, suffering from using terms outside their control. Or should they keep the IP flattening in place and not onboard with the service provider?

Additionally, there may be other situations, where 'IP flattening' is replaced with another technique employed to fix problems manifest to SPF policy deployments and the 'ESP domain validation' exploit could be some other alternative use of published SPF policies. In such cases, domain owners may face similar difficult decisions between maintaining a sound functioning policy and conforming to the impertinent demands of an ESP.

Policy Terms Regulation

Embodiments of the present disclosure propose a solution that allows the customary method of deploying a SPF policy that best expresses the intent of the domain owner's sender authorizations to co-exist with more untrustworthy SPF terms while reaping the benefits of the former and avoiding the problems of the latter. This dual functionality may be realized by constructing a policy term that deliberately renders parts of a policy inactive.

Embodiments of the present disclosure propose that terms in an SPF policy can be introduced to regulate which mechanisms and/or modifiers are tested during the authentication process. An example of this is the inclusion of a specially-engineered term or set of terms that has the effect of rendering all succeeding terms inactive. This type of policy regulation may be effected by the inclusion of the following set of terms depicted in the root (@) policy as illustrated by Table 1 in FIG. 1.

In effect, this child policy should match on every IP in both the IPv4 and IPv6 space; the preceding dash (-) in the parent policy results in an explicit 'fail' being returned to the verifier. Since SPF terms are evaluated from left to right, the explicit match at that point effectively renders all succeeding terms inert to authentication checks. This improved scheme better-ensures that mechanisms beyond the restriction point, i.e., left of the regulating terms, are not used during host checks, thus avoiding the problems characteristic of using traditional includes.

Reducing the Complexity of SPF Service Onboarding

Universally, SPF service providers that are delegated the duties of policy management and hosting instruct their clients to configure an SPF policy that designates a domain of the service provider that supplies responses to SPF verification requests. Implementations of this scheme very often result in a policy depicted in FIG. 2. One embodiment of such policy may be, for example:

v=SPF1 include:_SPF.serviceprovider.com ~all

Aside from the mandatory version term (v=SPF1) and the trailing all term, the single functioning policy term could be implemented as the include term as shown here, other mechanisms, or possibly with a redirect modifier (without the all). Representation of a legacy policy that may have existed before delegating SPF service to the provider does not survive the transition.

Figure 3:
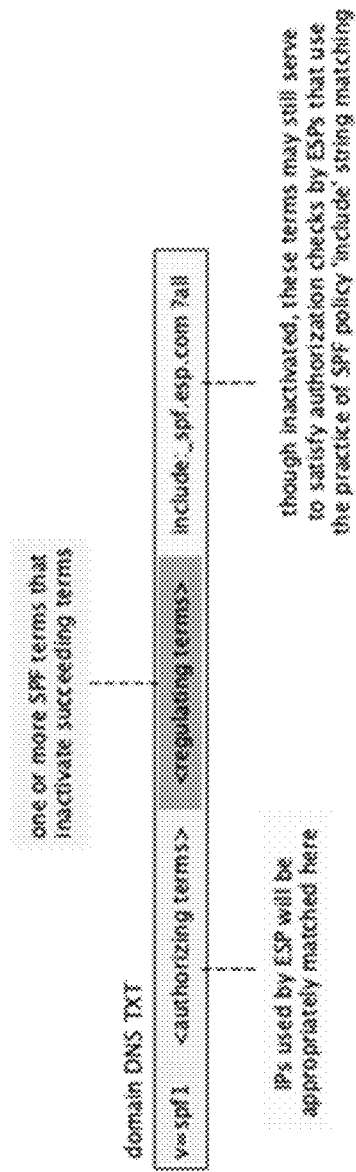
FIG. 3 illustrates another SPF schema consistent with embodiments of the present disclosure.

One technical advantage to domain owners who wish to use a service like SPF policy flattening is maintaining the ability to onboard with such a service without having to regress into a state of using active include terms that may negatively affect message verification and, thus, deliverability. Accordingly, onboarding with an SPF service provider may no longer require removal of an existing record. Instead, the domain owner only has to prepend the provider's SPF term (include, etc.) and immediately-succeeding policy inactivation term(s) to the existing record. Thus, a fully onboarded policy may resemble the following policy. FIG. 3 illustrates a policy schema to segregate policies at administratively independent provider and the legacy policy of the ADMD. One embodiment of such policy may be, for example (note: terms are line-wrapped to fit on the page):

v=SPF1 include:_SPF.domain.example.net -include:_SPF.inactivator.example.net mx a include:_SPF.google.com include:_SPF.some_esp1.com include:_SPF.another_esp2.com -all As far as message verifiers are concerned, either a message validates under the left-most policy hosted by the SPF service provider, or it explicitly fails under the second inactivation policy; left-to-right testing should not proceed beyond these two tests.

As for the ESPs that would use something like a simple include string matching process to validate a client domain, their demand may still be satisfied. For example, their matching software will query the SPF policy for the string include:_SPF.some_esp1.com; finding this positioned before the all term (explicit or implied) in the policy, the domain may be considered validated for service.

Precise and Deliberate Failure Assertions

Previously, the simplistic example of regulating policy evaluation by including a simple all term always to match:

"v=SPF1 +all"

This should, in the effects of policy evaluation, be very similar to simply inserting a failing all term immediately proximal to the inactive policy terms. The result of DNS queries not matching on leading active term tests would subsequently match on the inactivation term as such.

Improved precision over which message sources should fail verification checks may be realized by using a more substantive policy nested under the inactivation term. One such technique is to engineer the inactivation policy to match on the compliment set of authorized IPs, i.e., any IP that does not match with the active policy will match on the inactivation policy with a fail qualifier. Thus, there are multiple strategies possible beyond the simple minded match all scheme and matching on a compliment set of IPs. In any case, the objective is to be able to retain legacy policy terms that under normal operations do not participate in the SPF verification process.

Additional Embodiments

The following disclose various aspects of the present disclosure. The aspects describe various non-limiting embodiments of the present disclosure. In some instances, the aspects present various additional embodiments or additional explanations of the foregoing.

Figure 4:
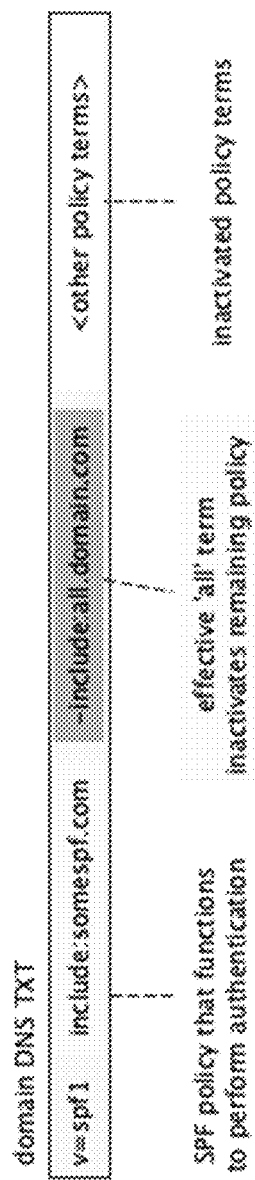
FIG. 4 illustrates yet another SPF schema consistent with embodiments of the present disclosure.
Figure 5:
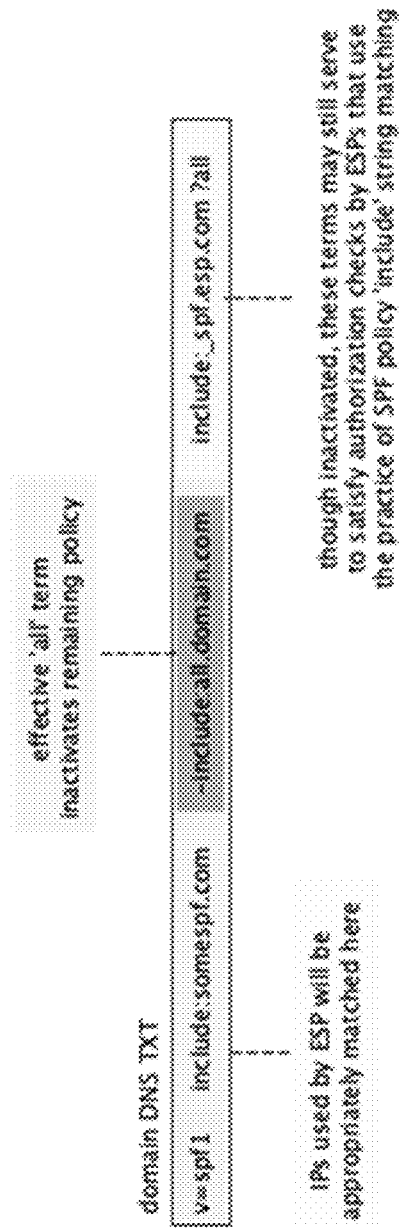
FIG. 5 illustrates still another SPF schema consistent with embodiments of the present disclosure.

As illustrated in FIG. 4 and FIG. 5, various aspects of the present disclosure may comprise an include mechanism that matches on everything (particularly negative include) so that it functions like an all term to prevent the remainder of the policy from being evaluated.

In this way, an 'all' term is basically forced to be evaluated before the end of the policy, whereas 'all' terms are usually evaluated after all other mechanisms In case of out-of-order evaluation, embodiments presented herein avoid a match on +all rather return the inverse set of IPs that are authorized by our other include terms.

Various aspects of the present disclosure enable platform users to set a custom TTL on the "all" term. In this way, users may be enabled to more quickly authorize new flows while using much higher TTL to expedite processing for existing vendors. This may also mean that those known vendors will be resolved faster via DNS's inherent caching capabilities.

Typical method of users authorizing mail sending services may be illustrated as follows:

domain.com: v=SPF1 mechanism:vendor1 mechanism:vendor2 mechanism:vendor3 -all

Typical method of users and/or vendors performing any flavor of SPF record flattening may be illustrated as follows:

domain.com: v=SPF1 mechanism:flatten1 -all

Flatten1: v=SPF1 mechanism:vendor1 mechanism:vendor2 mechanism:vendor3

To reduce DNS lookups, each vendor is routinely decomposed into non-DNS terms like IP4 and IP6 mechanisms or resolved inside the flattening service via use of an exists term and macro expansion.

Domain.com: v=SPF1 exists:flatten1 include:flatten2 -all

Flatten1: returns a match if the macro expansion results in a "pass"

Often, naive email service provider (ESP) domain verification methods require the vendor mechanism be present in the client's top level domain. Thus, even when attempting to improve the efficiency and/or effectiveness of a policy, it may still appear as follows:

Domain.com: v=SPF1 mechanism: enhancement mechanism:vendor1 mechanism:vendor2 -all Now considering specific errors such as "too many DNS lookups". So long as the policy is evaluated left to right (as per the SPF specification) and the enhancement mechanism matches, the vendor mechanisms need not cause additional DNS lookups and the requisite "permerror". However, the situation is much worse when considering an illegitimate mail source that the domain.com operator intended to block via the "-all" or "fail" at the end of their record. In such case, the enhancement mechanism returns no-match and evaluation continues into vendor1 and vendor2's mechanisms, commonly exceeding SPF protocol limitations resulting in an immediate permerror. The result is that mail a domain operator wishes to block is not blocked but treated as a policy error with handling left to the discretion of the mail receiver.

In some embodiments, domain operators may implement the following to combat this issue:

Domain.com: v=SPF1 mechanism:enhancement -all mechanism:vendor1 mechanism:vendor2

At first glance, this looks like a clever solution to both block unauthorized mail while still satisfying ESP requirements that a domain's SPF record contain mechanism:vendor. However, the SPF specification appears to have been written to accommodate the more common desire of a domain operator. In the common case a domain owner may have a policy comprising, for example:

Domain.com: v=SPF1 mechanism:vendor1 -all

And they decide to start using an additional ESP. The ESP (vendor2) commonly tells the domain owners to add "mechanism:vendor2" or, worse yet, create a new TXT (SPF) record.

Domain.com: v=SPF1 mechanism:vendor1 -all
Domain.com: v=SPF1 mechanism:vendor2 -all Thus, a domain owner has multiple SPF records, cause for an immediate permerror according to the spec. It may be construed that the inability of standards/spec compliant mail receivers to accept such dual records is not simply an oversight of the SPF protocol but the result of determining the intent of the domain owner. Perhaps the domain owner did not intend to have two competing policies. If one is evaluated, vendor2 is blocked, if two is evaluated, vendor 1 is blocked. A permerror, rather than an SPF failure seems more appropriate.

In this simple example, it may be possible or even sensible for a receiving mail server to intelligently merge these policies, resulting in, for example:

Domain.com's effective policy: v=SPF1 mechanism:vendor1 mechanism:vendor2 -all

DNS servers commonly return records in unspecified order so it is not possible to guarantee the order. Thus, even a slightly more complicated case of multiple records becomes problematic to merge. Leaving such complex decisions up to the mail receiver would be detrimental to domain owners trying to understand how their domain's messages (or unauthorized and intended to be blocked messages) are handled by receivers. Again, there may be merit of multiple SPF records evaluating as a permerror.

Now, consider that instead of creating two distinct SPF strings, the domain owner, either by better advice from their ESP or their own familiarity with invalidity of multiple SPF records choose to append vendor2 to their existing record.

Thus, their policy becomes, for example:

Domain.com: v=SPF1 mechanism:vendor1 -all mechanism:vendor2

As the all term of SPF is not a mechanism but a modifier it is defined to be evaluated as a catch-all at the end of policy evaluation. Thus, all reasonably standards compliant message and policy processors will evaluate the policy as if it were:

Domain.com v=SPF1 mechanism:vendor1 mechanism:vendor2 -all.

Accordingly, in some embodiments, all-terms may be evaluated in place, along with the mechanisms rather than as modifiers resigned to evaluation only after every mechanism has been evaluated. This may allow a unique and desirable ability to both benefit from enhanced mechanisms while also remaining compliant with the ever-present ESP requirements of an SPF record containing the vendor's mechanism.

Referring back to the earlier example: Domain.com: v=spf1 mechanism:enhancement -all mechanism:vendor1 mechanism:vendor, would be evaluated in this order: 1) Mechanism:enhancement; and 2) -all, thereby rendering mechanism:vendor1 and mechanism:vendor2 ineffective. These terms would be present in the domain.com policy to satisfy ESP domain ownership and authorization requirements that are widespread across the landscape.

This change would require updating each and every mail receiver and even the SPF specification itself. Acknowledging the merits of SPF's current implementation, changing it seems ill-advised and counting on every mail receiver to deploy new software is hugely impractical, at best, perhaps closer to impossible.

By illustrative, non-limiting terminology, a virtual all" term that is fully backwards compatible with current SPF specifications and implementations is provided with the embodiments disclosed herein. This virtual all term would allow a domain owner to arbitrarily snip their policy, rendering any subsequent mechanisms ineffective.

In accordance to the embodiments disclosed herein, an example policy:

Domain.com: v=spf1 mechanism:enhanced -virtual-all-term mechanism:vendor1 mechanism:vendor2 -all may be evaluated as:
1) Mechanism:enhancement; and
2) Fail everything else.

The remaining two vendor mechanisms and traditional all-term would not be evaluated.

An ESP checking the SPF policy in the common way they do, by string matching rather than full evaluation would indeed find their requisite mechanism:vendor present in the record.

In this way, the technical advantages of the virtual all term may be, but not limited to, for example: enhancements to SPF to improve efficiency and effectiveness while remaining compliant with ESP verification, and still successfully evaluating to fail/block unauthorized mail flows before the number or composition of subsequent mechanisms cause a policy to evaluate to an error condition.

Continuing with example policies:

v=spf1 mechanism:enhancement -mechanism:virtual-all-term mechanism:vendor1 -all

In some embodiments, virtual all may use a mechanism so as to be evaluated in left-to-right order along with other mechanisms. It is qualified with the same qualifier a domain owner may wish to use on a traditional all term that comes last in policy evaluation.

Consistent with embodiments of the present disclosure, the virtual all term may be configured to match everything. Thus, any policy evaluation that does not match on mechanism:enhancement continues to mechanism:virtual-all where it always matches and now applies the desired qualifier.

In yet further embodiments of the present disclosure multiple virtual all terms could be used together. The combination of one or more virtual all term need not truly match everything as it would suffice to only match the opposite set of that matched by the preceding mechanism.

In the following example, Domain.com wishes to have a policy of:

v=spf1 ip4:128.0.0.0/1 -all include:vendor1 include:vendor2

In the above example, vendor1 and vendor2 are inactive yet present in the policy for purposes of, for example, ESP authorization.

This can be done using a virtual all in accordance to embodiments of the present disclosure. For example:

v=spf1 ip4:128.0.0.0/1 -ip4:0.0.0.0/1 -ip6:0::/0 include:vendor1 include:vendor2

The first IP4 term matches the IP domain.com uses to send mail and the combination of two negatively qualified ip4: CIDR netblocks combine to match all IP4 addresses, SPF evaluation is completed prior to encountering the vendor terms. This example has neglected ip6 senders that are increasingly common at the time of writing and could be blocked by use of additional negatively qualified virtual all terms including, for example, ip6:0::/0. In some embodiments, Hexspeak may be used.

Receivers might silently ignore /0 CIDR if they think nobody in their right mind would intentionally include the entire internet of IP4 of IP6 space. In this instance, combining multiple smaller CIDR blocks may be considered.

An even simpler example of a virtual all term can be constructed if the administrator is willing to incur the cost of an additional DSN lookup. For example:

Domain.com: v=spf1 ip4:128.0.0.0/1 -include:all.domain.com include:vendor1 include:vendor2 all.domain.com: v=spf1 ip4:0.0.0.0/1 ip6:0::/0

The technical advantage associated with nesting offers a benefit of adding clarity and simplicity for the domain.com operator since they could use a single virtual all term and qualify it as the would a traditional all term. The nested all.domain.com policy may have a (+)all that matches on everything and thus returns a match upstream to domain-.com's include. In some instances, a nested +all term may not be valuated, and thus, the foregoing example is provided. It should be noted that all.domain.com is an example, and other addresses may be used.

Still consistent with embodiments of the present disclosure, if necessary to satisfy some slightly more comprehensive ESP query such as burning the +all below a macro expansion, the following example is provided:

Domain.com v=spf1 ip4: 128.0.0.0/1 -include:%{i}.virtual-all.com include:vendor1 include:vendor2

Where virtual-all.com trivially produces a wildcard policy that will match any ip 6.virtual-all.com v=spf1 all Where i is the sender IP address This leads to the following SPF DNS query (supposing sender ip is 123.123.123.123):

123.123.123.123.virtual-all.com

In certain embodiments, the following additional policy may be published, as an example: %{i}.virtual-all.com: v=spf, in case the ESP naively queries without expanding the macro. In the foregoing example, as the ESP tends to not truly evaluate a sent email they wouldn't be likely to populate any macro expansions.

Hardware Implementation

The various aspects of the present disclosure may be provided by a technical platform. The platform may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform may be hosted on a centralized server, such as, for example, a cloud computing service. The various methods been described may be performed by a computing device associated with a platform. It should be understood that, in some embodiments, different operations may be performed by different networked elements in operative communication with the computing device.

This disclosure further provides one or more examples of a method of a plurality of methods that may be performed by at least one of the aforementioned modules, or components thereof. Various hardware components may be used at the various stages of operations disclosed with reference to each module. For example, although methods may be described to be performed by a single computing device, it should be understood that, in some embodiments, different operations may be performed by different networked elements in operative communication with the computing device. For example, at least one computing device may be employed in the performance of some or all of the stages disclosed with regard to the methods.

Furthermore, although the stages of the example methods are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

The computing device may comprise a system having a memory storage and a processing unit. The processing unit coupled to the memory storage, wherein the processing unit is configured to perform the stages of the various methods herein.

Figure 6:
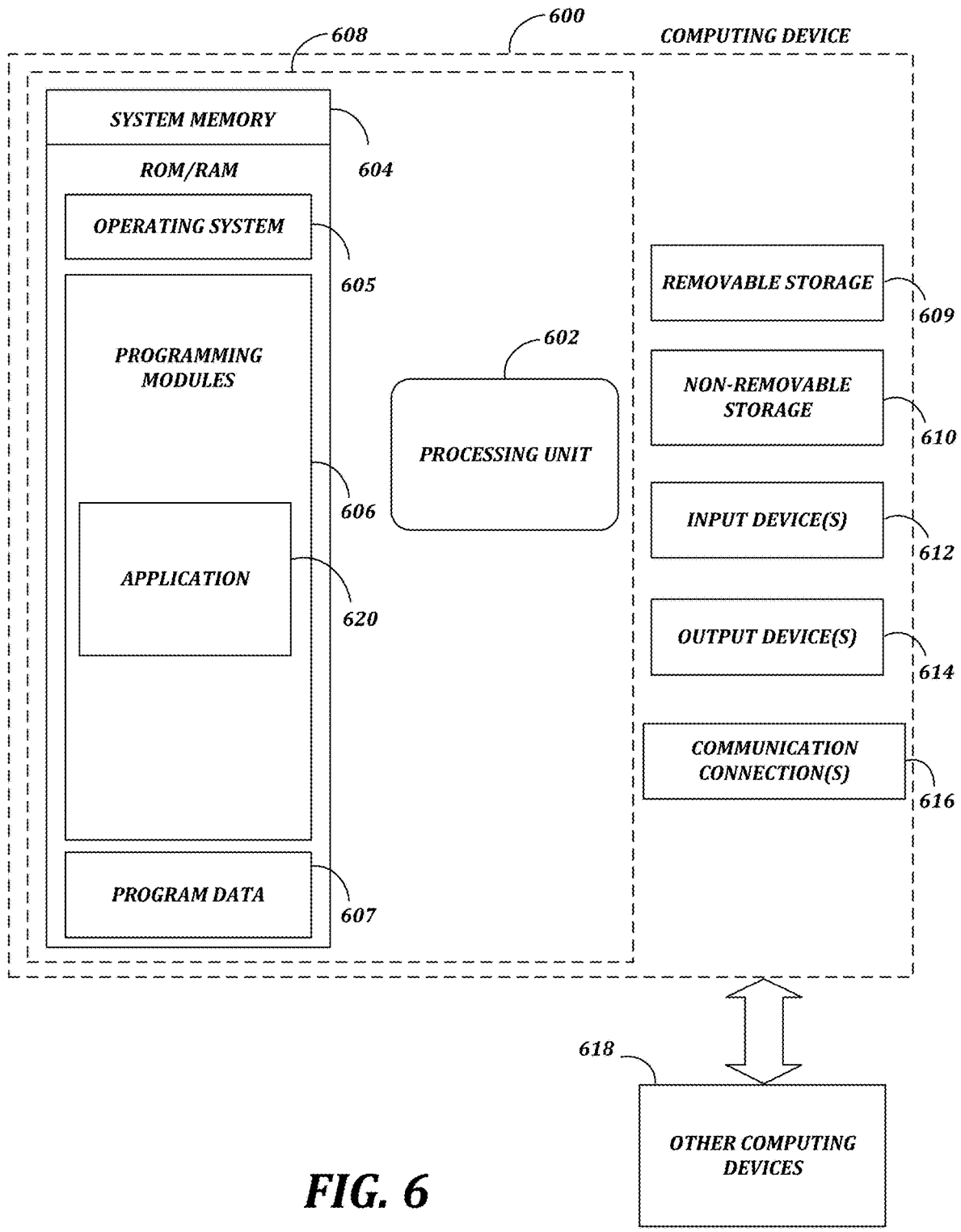
FIG. 6 is a block diagram of a system including a computing device for providing a platform consistent with embodiments of the present disclosure.

FIG. 6 is a block diagram of a system including computing device 600. Consistent with an embodiment of the disclosure, the aforementioned memory storage and processing unit may be implemented in a computing device, such as computing device 600 of FIG. 6. Any suitable combination of hardware, software, or firmware may be used to implement the memory storage and processing unit. For example, the memory storage and processing unit may be implemented with computing device 600 or any of other computing devices 618, in combination with computing device 600. The aforementioned system, device, and processors are examples and other systems, devices, and processors may comprise the aforementioned memory storage and processing unit, consistent with embodiments of the disclosure.

With reference to FIG. 6, a system consistent with an embodiment of the disclosure may include a computing device, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination. System memory 604 may include operating system 605, one or more programming modules 606, and may include a program data 607. Operating system 605, for example, may be suitable for controlling computing device 600's operation. In one embodiment, programming modules 606 may include an SPF policy controller configured to create, modify, or remove SPF policies on behalf of its users. Furthermore, embodiments of the disclosure may be practiced in conjunction with a graphics library, other operating systems, or any other application program and is not limited to any particular application or system. This basic configuration is illustrated in FIG. 6 by those components within a dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a touch input device, etc. Output device(s) 614 such as a display, speakers, a printer, etc. may also be included. The aforementioned devices are examples and others may be used.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 604, including operating system 605. While executing on processing unit 602, programming modules 606 (e.g., SPF controller application 620) may perform processes including, for example, one or more of the methods as described above. The aforementioned process is an example, and processing unit 602 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and other form of solid state storage. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or an optical drive, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A method comprising:
   generating a virtual all term for inclusion in a Sender Policy Framework (SPF) policy used to manage a domain's policy,
      wherein the virtual all term is associated with one of the following:
         an inverse of active policy terms in an SPF policy evaluated in out-of-order SPF policy processing, and
         every internet protocol address, and
      wherein the virtual all term is provided for inclusion into the SPF policy prior to the domain's pre-existing policy term.

2. The method of claim 1, wherein generating the virtual all term comprises generating an SPF modifier and mechanism associated with one of the following:
   an inverse of active policy terms in the SPF policy evaluated in out-of-order SPF policy processing, and
   every internet protocol address.

3. The method of claim 1, wherein generating the virtual all term comprises generating an -include term to be inserted into the SPF policy.

4. The method of claim 1, wherein generating the virtual all term comprises generating an SPF policy term configured to:
   cause a match, and
   terminate SPF policy processing.

5. The method of claim 4, wherein generating the virtual all term comprises generating the virtual all term configured to render any subsequent term in an SPF policy inactive.

6. The method of claim 5, wherein generating the virtual all term comprises generating the virtual all term configured to inactivate third-party provided include terms in the SPF policy.

7. A method comprising:
   publishing a Sender Policy Framework (SPF) policy for a domain, the SPF policy comprising a virtual all term,
      wherein the virtual all term is associated with one of the following:
         in out-of-order SPF policy processing, an inverse of active policy terms in the SPF policy, and
         in left-to-right SPF policy processing, every internet protocol address, and
      wherein the virtual all term is included in the SPF policy prior to the domain's pre-existing policy term.

8. The method of claim 7, wherein publishing the virtual all term comprises publishing an SPF modifier and mechanism associated with one of the following:
   the inverse of active policy terms in the SPF policy evaluated in out-of-order SPF policy processing, and
   every internet protocol address.

9. The method of claim 7, wherein publishing the virtual all term comprises publishing an -include term to be inserted into an SPF policy.

10. The method of claim 7, wherein publishing the virtual all term comprises publishing an SPF policy term configured to cause a match and terminated SPF policy processing.

11. The method of claim 10, wherein publishing the virtual all term comprises publishing the virtual all term configured to render any subsequent term in the SPF policy inactive.

12. The method of claim 11, wherein publishing the virtual all term comprises publishing the virtual all term configured to inactivate the processing of third-party provided include terms.

13. A method comprising:
providing a virtual all term for inclusion in an SPF policy of a domain,
wherein providing the virtual all term comprises providing the virtual all term associated with one of the following:
an inverse of active policy terms in the SPF policy for out-of-order SPF policy processing, and
every internet protocol address for left-to-right SPF policy processing, and
wherein the virtual all term is provided for insertion into the SPF policy prior to the domain's pre-existing policy term.

14. The method of claim 13, wherein providing the virtual all term comprises providing an SPF modifier and mechanism associated with one of the following:
the inverse of active policy terms in the SPF policy evaluated in out-of-order SPF policy processing, and
every internet protocol address.

15. The method of claim 13, wherein providing the virtual all term comprises providing a -include term to be inserted into the SPF policy.

16. The method of claim 13, wherein providing the virtual all term comprises providing an SPF policy term configured to:
cause a match, and
terminate subsequent SPF policy processing.

17. The method of claim 16, wherein providing the virtual all term comprises providing the virtual all term configured to render any subsequent term in the SPF policy inactive.

18. The method of claim 17, wherein providing the virtual all term comprises providing the virtual all term configured to inactivate a processing of third-party provided include terms in the SPF policy.

* * * * *